United States Patent
Li et al.

(10) Patent No.: US 11,519,043 B2
(45) Date of Patent: Dec. 6, 2022

(54) ROLLER TREATMENT PROCESS AND TREATMENT DEVICE SUITABLE FOR TOTAL-AMOUNT STEEL SLAG TREATMENT

(71) Applicant: BAOSHAN IRON & STEEL CO., LTD., Shanghai (CN)

(72) Inventors: Yongqian Li, Shanghai (CN); Yongli Xiao, Shanghai (CN); Yin Liu, Shanghai (CN); Youping Zhang, Shanghai (CN); Mengqin Xie, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 759 days.

(21) Appl. No.: 16/311,880

(22) PCT Filed: Mar. 17, 2017

(86) PCT No.: PCT/CN2017/077028
§ 371 (c)(1),
(2) Date: Dec. 20, 2018

(87) PCT Pub. No.: WO2018/000858
PCT Pub. Date: Jan. 4, 2018

(65) Prior Publication Data
US 2019/0203307 A1    Jul. 4, 2019

(30) Foreign Application Priority Data

Jun. 30, 2016 (CN) .......................... 201610500261.9

(51) Int. Cl.
*C21B 3/08* (2006.01)
*C21B 3/06* (2006.01)
*F27D 3/15* (2006.01)

(52) U.S. Cl.
CPC .................. *C21B 3/08* (2013.01); *C21B 3/06* (2013.01); *F27D 3/1545* (2013.01);
(Continued)

(58) Field of Classification Search
CPC ........ C21B 2400/022; C21B 2400/052; C21B 2400/064; C21B 2400/066;
(Continued)

(56) References Cited

U.S. PATENT DOCUMENTS 3,894,728 A * 7/1975 Berkens ................ F27D 3/1545
266/228
4,039,173 A * 8/1977 Papafingos ............... C22B 7/04
266/201

(Continued)

FOREIGN PATENT DOCUMENTS

CN           2734764 Y        10/2005
CN           101760572        6/2010
(Continued)

OTHER PUBLICATIONS

Supplementary European Search Report dated Nov. 8, 2019 for European Patent Application No. 17818857.
(Continued)

*Primary Examiner* — Scott R Kastler
*Assistant Examiner* — Michael Aboagye
(74) *Attorney, Agent, or Firm* — Lei Fang, Esq.; Smith Tempel Blaha LLC

(57) ABSTRACT

A roller treatment process and a treatment device suitable for a total-amount steel slag treatment. The treatment process is: firstly, a slag tank (2) with the molten slag is tightly held by a slag tank tilting mechanism and moved to a slag inlet position, the slag tank (2) is tilted to pour the molten slag with good fluidity into a rotary roller device (5) through a feeding chute (51), so that a roller treatment is achieved;
(Continued)

secondly, when the steel slag (3) without fluidity in the slag tank (2) cannot flow out, a slag removal machine (4) is used for pushing the high-viscosity slag or the solid slag into the roller device (5); and thirdly, the slag tank (2) is reversed by a large angle tilting to make the slag at the bottom of the tank drop into the roller device (5), so that the total-amount steel slag treatment of the same roller device (5) is achieved. The treatment device comprises a feeding system, the roller device (5), a particle slag conveying and storage system (7), a tail gas emission and purification system (6), a cooling water circulation system (8), a cold steel cleaning mechanism (10) and an electric control system (9); and the feeding system comprises the slag tank tilting mechanism (1), the slag tank (2), the molten slag (3) and the slag removal machine (4).

7 Claims, 7 Drawing Sheets

(52) U.S. Cl.
CPC .. *C21B 2400/022* (2018.08); *C21B 2400/052* (2018.08); *C21B 2400/066* (2018.08); *Y02W 30/50* (2015.05)

(58) Field of Classification Search
CPC ....... C21B 2400/072; C21B 3/06; C21B 3/08; F27D 3/15; F27D 3/1545
USPC .... 266/227, 228, 229, 201, 44; 75/672, 640, 75/655; 241/23, 65, 171, 176, 177, 178, 241/220
See application file for complete search history.

(56) References Cited

U.S. PATENT DOCUMENTS

| | | | | |
|---|---|---|---|---|
| 4,637,591 | A * | 1/1987 | McMahon | C22B 7/04 266/165 |
| 4,909,837 | A * | 3/1990 | Hansen | C21B 3/08 264/8 |
| 7,635,100 | B2 * | 12/2009 | Zhang | C21B 3/08 241/23 |
| 7,943,083 | B2 * | 5/2011 | Xiao | B02C 17/06 266/227 |
| 9,084,999 | B2 * | 7/2015 | Xiao | C21B 3/08 |

FOREIGN PATENT DOCUMENTS

| | | | | |
|---|---|---|---|---|
| CN | 103421913 | | 12/2013 | |
| CN | 103484578 A | | 1/2014 | |
| CN | 103849698 | | 6/2014 | |
| CN | 104844309 | | 8/2015 | |
| CN | 104894309 | * | 9/2015 | .......... F27D 3/1545 |
| CN | 204727907 | | 10/2015 | |
| WO | 2012024835 | | 3/2012 | |

OTHER PUBLICATIONS

Office Action dated Apr. 26, 2021 for Korean Patent Application No. 20197000349.

Office Action dated Nov. 1, 2021 from Viet Nam for the companion VN application 1-2018-05937.

Office Action dated Apr. 10, 2021 from IP India for Application No. 201917003350.

* cited by examiner

ROLLER TREATMENT PROCESS AND TREATMENT DEVICE SUITABLE FOR TOTAL-AMOUNT STEEL SLAG TREATMENT

CROSS-REFERENCE TO RELATED APPLICATIONS

This application is a 371 U.S. National Phase of PCT International Application No. PCT/CN2017/077028 filed on Mar. 17, 2017, which claims benefit and priority to Chinese patent application no. 201610500261.9 filed on Jun. 30, 2016. Both of the above-referenced applications are incorporated by reference herein in their entireties.

TECHNICAL FIELD

The disclosure relates to a method and an apparatus for metallurgical slag treatment, in particular to a roller treatment process and a treatment device suitable for total-amount steel slag treatment.

BACKGROUND ART

Steel slag is one of the bulk byproducts generated in steel production, accounting for about 10-30% of the output of crude steel. Steel slag is a complex mixture mainly consisting of oxides of metals such as calcium, magnesium, silicon, aluminum, iron and the like, oxides of non-metals such as phosphorus and sulfur, and various high melting polymers, with 1-10% metallic iron of varying particle sizes entrained therein. Steel slag exiting a furnace shortly has a temperature up to about 1500° C., most of which is in a molten state and exhibits certain fluidity. However, as its temperature decreases, the viscosity of the steel slag rises rapidly, and plenty of heat is released. As steel making processes differ from one steel maker to another, steel slag produced in smelting also differs somehow in composition and temperature: some high-temperature steel slag has good fluidity, capable of being poured like water; while some steel slag has so poor fluidity that it can hardly be dumped out in a convenient way from a slag tank (a container for holding and conveying high-temperature slag, also called slag ladle), and a mechanical force must be applied or the slag tank must be inverted to dump the slag from the slag tank. In order to prevent high-temperature steel slag from impacting the bottom of a slag tank when it is infused into the slag tank, and thus extend the service life of the slag tank, it's necessary to line the bottom of an empty slag tank with some cold slag before receiving slag from a converter. When high-temperature slag is infused into the slag tank, this cold slag contacts the high-temperature slag and mingles with it, together with steel lag on the inner wall of the slag tank, to form several tons or more than ten tons of large slag lumps, accounting for about one fourth to half of the total amount of the slag. The slag formed this way is also called tank bottom slag. Complexity of compositions and diversity of forms of steel slag result in great difficulty in steel slag treatment and subsequent use.

The most common steel slag treatment process is hot splashing+post-treatment. Specifically, high-temperature steel slag is splashed to a slag treatment spot for cooling in air; cooled steel slag is then broken, magnetically selected and screened; recovered cold steel is returned to a production procedure for use; and tail slag that is left after screening is recycled or sold commercially depending on its particle size and properties. Steel slag may be classified into a silicate material, which is inherently poor in thermal conductivity, and cools down extremely slowly in air. To increase the efficiency of steel slag cooling treatment and reduce the cooling treatment spot, measures such as mechanical shovel turning, cooling water spray and the like are often employed in a slag treatment plant where powder dust and waste steam diffuse. The working environment is bad, and powder dust in the surroundings is far out of limits. Moreover, risk of explosion can be caused by just a bit of carelessness. Nowadays, increasingly stringent requirements are imposed on environmental protection. A short-cycle process for treating high-temperature slag in a rapid, safe, environmentally friendly manner becomes a focus of urgent exploration by iron and steel enterprises. A roller technology for steel slag treatment developed by an iron and steel making enterprise was born at the right moment under such a background. It's a new technology for rapid hot-state treatment of steel slag in a closed space with resources recycled, wherein high-temperature metallurgical molten slag is cooled dynamically, continuously, rapidly and broken into a final slag product of particles having a particle diameter of less than 50 mm in a closed vessel, and dust-containing tail gas produced in the process is collected through a flue and purified for emission on standard through a smokestack. In addition, waste water is recycled with zero emission. This technology completely alters the status in quo of the other treatment processes where emission is not limited. This process is not only characterized by a short cycle and low capital cost, but also can be manipulated conveniently, safely and reliably. After treatment, steel slag may be used as a resource directly. Hence, this technology has been accepted by the industry once it emerged. The process technology and equipment level are under continuous promotion and rapid development along with industrial application and commercial popularization. Nevertheless, due to the limitation of the technological development so far, a single unit in a conventional roller process can only treat steel slag having good fluidity. Even with the aid of a slag tank tilting mechanism and a slag removal machine, only a portion of thick and viscous solid steel slag can be moved into the roller quantitatively. Bulky slag at the bottom of the tank needs to be treated using a specialized roller device for the tank bottom slag. This requires that two types of roller devices, namely one roller for special treatment of molten slag and one roller for special treatment of tank bottom slag, should be equipped when a steel slag treatment enterprise has chosen a roller process. Total-amount roller treatment of steel slag can be achieved only when these two types of rollers match with each other appropriately, for example, 2+1 or 3+2, selected depending on the difference in slag quantity and properties. This certainly increases the investment, maintenance cost and inspection cost of the enterprise. Patent applications, publications and other relevant literatures associating with the roller process technology for steel slag treatment all focus on a part of the technology. No roller process or device for total-amount steel slag treatment is available.

Chinese Patent Applications CN200420107540.1 and CN200810207918.8 propose a "device for tilted roller treatment of metallurgical slag" and a "process and device for tilted roller treatment of high-temperature molten slag" respectively. They mainly involve a body structure of a roller, wherein molten slag having certain fluidity is cooled rapidly with a plurality of media in sequence in the roller, broken and transported out of the device. This type of roller devices is unable to treat solid slag having no fluidity, particularly bulky tank bottom slag. Patent Applications CN200910050400.2 and WO 2012/024835 disclose processes and devices for treatment of high-temperature solid steel slag (tank bottom slag). By installing a large volume feeding roller body with a feed port in front of an existing working roller body, a buffer effect of the feeding roller body may be taken advantage of to turn over the tank once for all and treat the tank bottom slag in steps. Due to the structural limitation of these devices, they are only useful for treatment of bulky steel slag of the tank bottom slag type. Chinese Patent Application No. 99244833.6 discloses a replaceable slag receiving chute lined with a durable material for a roller slag treatment device, and Chinese Patent Application No. 201120266445.6 discloses a rotary funnel, wherein the problems that high-temperature molten slag sticks to a chute wall and blocks the chute are alleviated to certain degree. However, such a chute or funnel is only suitable for continuous, controllable feeding of slag. In other words, limited by the diameter of a slag feed port, such a feeding chute or funnel is only suitable for slag flow or removal at a small flow rate. Chinese Patent Applications CN201210197124.4, CN201310350518.3, CN02266663.X and CN200820151424.8 describe solutions and devices from various viewpoints wherein bulky solid steel slag is introduced into a roller. Chinese Patent Application CN201120412146.9 discloses an impact resistant feeding funnel in a device for roller treatment of slag, wherein the sidewall of the funnel is reinforced by positioning radial ribs and axial ribs at the exterior of the feeding funnel, and a breaking frame is positioned inside the funnel for pre-breaking bulky steel slag, so as to achieve an alleviation effect. These feeding methods and devices can only be used in cooperation with roller devices for treatment of solid slag. They are useful for treatment of bulky solid steel slag, but cannot treat flowable molten slag at the same time.

Chinese Patent Application CN200910052471.6 discloses a "device for feeding by tilting slag tank" from a viewpoint of feeding, wherein a fastening mechanism, a translating device and a tilting frame are used to achieve translation and tilting of a slag tank with the aid of a hydraulic system.

Chinese Patent Application CN200820150140.7 describes a spraying "device for purification of smokestack tail gas", wherein water-jetting guns and spray guns are arranged in a flue and a smokestack for purifying tail gas, and the tail gas is discharged through the smokestack after the dust concentration therein is ensured to be less than 50 mg/Nm$^3$.

Chinese Patent Application CN201020032862.X discloses a "device for online separation and sorting of roller slag", wherein online slag-iron separation, sorting, custody transfer and storage of roller slag are achieved with the use of a composite transporter, a vibrating sieve, an iron remover, a vibrating chute, a bucket elevator, a vibrating feeder, a magnetic separation roller, a guide chute, a sorting sieve and a storage tank.

A reference document titled "Status Study on Technological Development of BSSF Roller Steel Slag Treatment" (Environmental Engineering, No. 3, 2013) describes a roller slag treatment technology integrating "roller+slag tank tilting device+slag removal machine".

For an ideal roller steel slag treatment process and device, in addition to operating reliability, safety and environmental friendliness, low capital and running cost is also a feature that should be possessed. Such a process technology will involve flow and flow control over high-temperature steel slag (steady feeding), total-amount slag coverage in a single roller (capable of treating high-temperature molten slag having good fluidity and safely treating bulky solid steel slag), dynamic breaking in the roller, as well as a safe multimedia cooling process and a rapid slag-discharging process. It should also possess a suitable technical level of reliable particulate slag transportation, slag-water separation, economical online slag-iron separation, storage, satisfactory exhaust gas collection and purification, inter alia.

SUMMARY

One object of the disclosure is to provide a roller treatment process and a roller treatment device suitable for total-amount steel slag treatment, wherein a total-amount treatment target can be achieved in a single roller device capable of treating molten slag from steel making and treating solid tank bottom slag.

To achieve the above technical object, the disclosure utilizes the following technical solution.

A roller treatment process for total-amount steel slag treatment, comprising the following steps:

First, using a slag tank tilting mechanism to tightly hold a slag tank containing molten slag, moving the slag tank to a feeding position, and tilting the slag tank to pour molten slag having good fluidity into a rotating roller unit through a feeding chute, thereby realizing the roller treatment;

Second, using a slag removal machine to rake highly sticky slag or solid slag out to the roller unit when steel slag remaining in the slag tank does not have fluidity and cannot flow out, or when steel slag in the slag tank does not have fluidity and cannot flow out;

Third, tilting the slag tank to a larger angle to drop remaining tank bottom slag into the roller unit, thereby achieving the total-amount steel slag treatment in a single roller unit.

When the tank is manipulated to drop the tank bottom slag, spray of process cooling water in the roller unit is paused; when the dropping of the tank bottom slag is finished, the spray of the process cooling water is resumed, but after an additional period of pause time. The additional period of pause time before resuming the spray of the process cooling water is 2 minutes.

A roller treatment device for total-amount steel slag treatment, comprising a feeding system, a roller unit, a particulate slag conveying and storing system, a tail gas emitting and purifying system, a cooling water circulating system, a cold steel cleaning mechanism and an electronic control system;

wherein the feeding system comprises a slag tank tilting mechanism, a slag tank, a molten slag and a slag removal machine; the slag tank tilting mechanism is arranged off-set above a feeding chute in the roller unit; the slag tank tilting mechanism comprises a hydraulic mechanism and two tank holding arms, wherein the hydraulic mechanism can drive the slag tank tilting mechanism to move forward and backward along a horizontal rail, and the hydraulic mechanism can drive the two tank holding arms to lift the slag tank and control the slag tank to rotate at an angle of 0-180 degrees;

wherein the slag removal machine comprises a slag raking head, an extendable rod, a support and a second hydraulic mechanism, wherein the slag raking head is fixed to a front end of the extendable rod; the extendable rod is arranged on the support, wherein the extendable rod can extend forward and backward, and rotate up and down, left and right under control of the second hydraulic mechanism.

A thermal shield is fixed to a front end of the support for insulating and reflecting back thermal irradiation of the hot molten slag in the slag tank.

A steel framework is used for the feeding chute, wherein a substrate forms a chute frame having a top larger than a bottom; a chute wall has an angle θ of no less than 35° relative to a horizontal plane at a side directly receiving the molten slag; a heat resistant lining plate is attached to an inner wall at the side receiving the molten slag; a reinforcing rib and a supporting plate are arranged at a side opposite the side receiving the molten slag; an end face of the supporting plate contacts the chute frame, and another end face thereof contacts a stand positioned on the ground.

A positioning shaft is arranged at a bottom of the chute frame, wherein the positioning shaft acts to position the feeding chute; a pin shaft is arranged at a top of the chute frame, wherein the pin shaft is used to hoist the feeding chute; a steel plate having a groove shape is arranged at the top of the chute frame, for reinforcing the substrate and aiding in positioning.

The heat resistant lining plate has a trapezoid shape having a top larger than a bottom, placed directly on the inner wall at the side receiving slag.

The feeding chute has a feeding throat having a minimum size L of no less than 1500 mm.

The roller treatment process and treatment device suitable for total-amount steel slag treatment according to the disclosure have realized the object of total-amount treatment of molten slag from steel making in a single roller. By designing a novel feeding chute and a new process system, both molten steel slag having good fluidity and solid tank bottom slag having no fluidity are imported into the roller one after another by tilting the tank, raking the slag and inverting the tank with the aid of a slag tank tilting mechanism and a slag removal machine, thereby realizing safe, environmentally friendly roller process treatment of various types of steel slag in cooperation with a new spray cooling system.

The disclosure can achieve the target of total-amount treatment of both molten slag and solid tank bottom slag in a single roller unit. At the same time, such technical problems as uniform feeding, rapid cooling and granulation, long service life of the device, rapid cleaning of cold steel in the roller, online slag-iron separation and particulate slag sorting, economical tail gas emission on standard, recycling of cooling water and the like, are solve systematically. Short-cycle, environmentally friendly treatment and recycling of molten slag from steel making are fulfilled.

DESCRIPTION OF THE DRAWINGS

FIGS. 2 and 3 are schematic views showing a structure of a roller treatment device suitable for total-amount steel slag treatment according to the disclosure, wherein FIG. 2 shows a process scheme for treating molten slag having good fluidity and a portion of highly sticky solid steel slag by pouring and raking slag; FIG. 3 shows a process scheme for treating tank bottom slag by inverting the tank;

FIG. 7 shows several specialized forms of a grate, wherein FIG. 7a shows an upright T grate; FIG. 7b shows an inverted T grate; FIG. 7c shows a triangular grate; FIG. 7d shows an upright 7C grate; and FIG. 7e shows an inverted 7C grate;

In the figures: 1 slag tank tilting mechanism, 2 slag tank; 3 steel slag (molten slag/solid tank bottom slag), 4 slag removal mechanism, 5 roller unit, 6 tail gas emitting and purifying system, 7 particulate slag conveying and storing system, 8 water circulating system, 9 electronic control system, 10 cold steel cleaning mechanism 10;

41 replaceable slag raking head, 42 extendable rod, 43 thermal shield, 44 support, 45 second hydraulic mechanism;

51 feeding chute, 52 process water nozzle, 53 grate, 54 slag shoveling plate, 55 roller body, 56 discharging chute, 57 smoke hood, 58 retaining mechanism, 59 back supporting unit; 510 transmission mechanism, 511 steel balls, 512 front supporting unit, 513 fixed end cap;

51-1 heat resistant lining plate, 51-2 positioning shaft, 51-3 supporting plate, 51-4 rib, 51-5 pin shaft, 51-6 steel plate, 51-7 substrate, 58-1 conical retaining wheel, 58-2 support, 59-1 supporting wheel, 59-2 supporting shaft, 59-3 adjustable base, 59-4 adjusting mechanism, 59-5 scraping mechanism, 510-1 driving motor, 510-2 coupling, 510-3 speed reducer, 510-4 cardan shaft, 510-5 small gear shaft, 510-6 base, 513-1 hollow frame, 513-2 process water pipe connecting opening, 513-3 feeding chute receiving opening, 513-4 fixture stand, 513-5 access door;

61 flue, 62 water nozzle, 63 spray tower for dust removal, 64 spray nozzle, 65 demister, 66 blower, 67 smokestack;

71 combined conveyor, 72 slag steel blocks trolley, 73 first vibrating sieve, 74 haulage truck, 75 transient bin, 76 second vibrating sieve, 77 iron remover, 78 bucket elevator;

81 settling pool, 82 sludge cleaner, 83 clean water pool, 84 pH adjusting unit, 85 circulating water pump;

10-1 extendable arm, 10-2 base, 10-3 electromagnet, 10-4 cold steel trolley.

DETAILED DESCRIPTION

The invention will be further illustrated with reference to the following specific Examples and the accompanying drawings.

Figure 2:
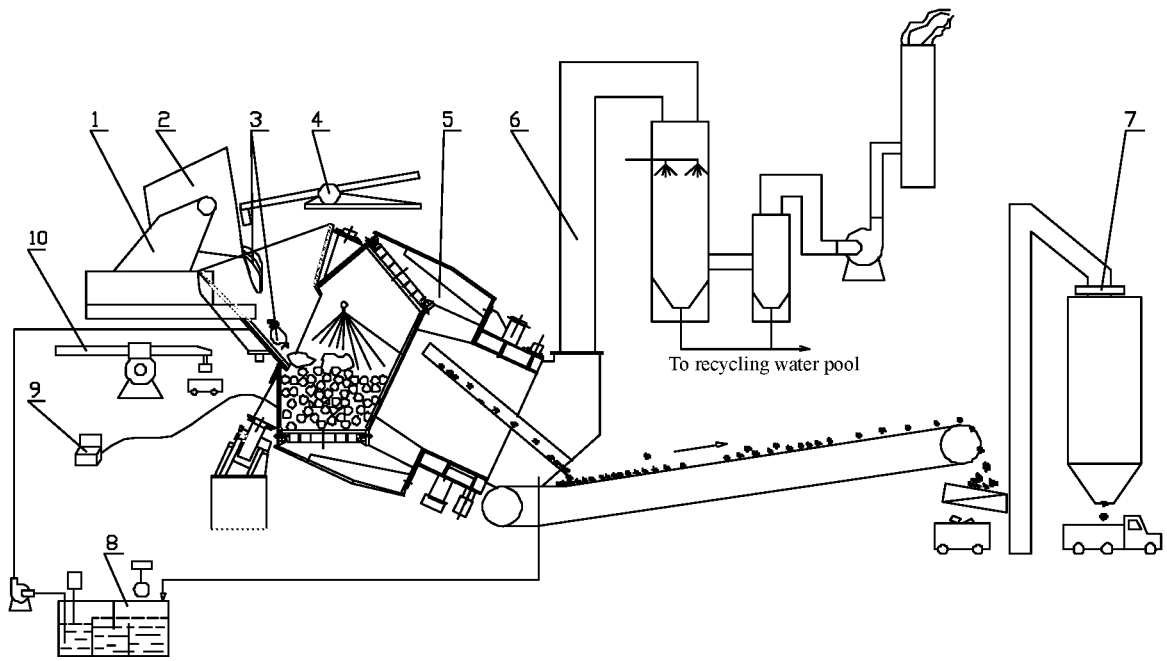
Figure 3:
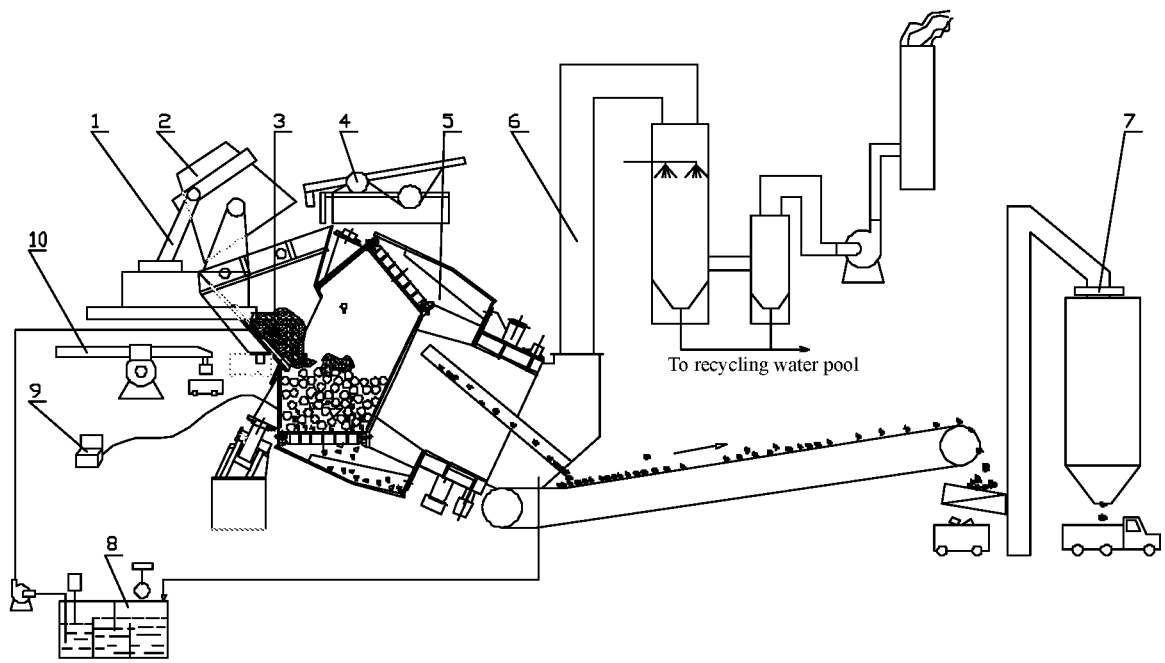

A roller treatment device suitable for total-amount steel slag treatment comprises a feeding system, a roller unit 5, a particulate slag conveying and storing system 7, a tail gas emitting and purifying system 6, a cooling water circulating system 8, a cold steel cleaning mechanism 10 and an electronic control system 9, wherein these systems combine organically to manipulate a complete roller treatment process for molten slag from steel making. See FIGS. 2 and 3, wherein FIG. 2 shows a process scheme for treating molten slag having good fluidity and a portion of highly sticky solid steel slag by pouring and raking slag (working state); FIG. 3 shows a process scheme for treating tank bottom slag by inverting the tank (working state).

The feeding system comprises a slag tank tilting mechanism 1, a slag tank 2, molten slag 3 and a slag removal machine 4.

The slag tank tilting mechanism 1 is arranged offset above a feeding chute 51 of a roller unit 5, and can be driven by a hydraulic mechanism to move forward and backward along a horizontal rail, so as to adjust a horizontal position of a slag tank mouth relative to the feeding chute 51. The slag tank tilting mechanism 1 comprises two tank holding arms which can be driven hydraulically to rotate, and thus can lift the slag tank 2 and control the slag tank 2 to rotate at an angle of 0-180 degrees, thereby facilitating controllable removal of the molten slag 3 from the slag tank 2 by pouring or by raking using the slag removal machine 4.

Figure 4:
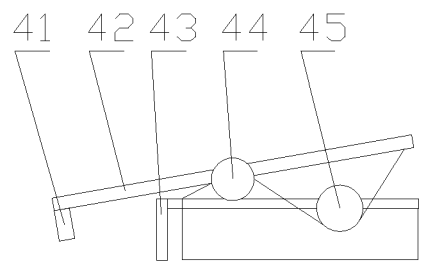
FIG. 4 is a schematic view showing a structure of a slag removal mechanism.

The slag removal machine 4 is equipped with a replaceable slag raking head 41 which is fixed to a front end of an extendable rod 42 arranged on a support 44. Under control of a second hydraulic mechanism 45, the extendable rod 42 can extend forward and backward, and rotate up and down as well as left and right in a convenient manner. A thermal shield 43 is arranged at a front end of the support 44 to insulate and reflect back thermal irradiation of the hot molten slag 3 in the slag tank 2, thereby maintaining a normal operating temperature of the hydraulic system. See FIG. 4, which is a schematic view showing a structure of a slag removal mechanism.

Figure 5:
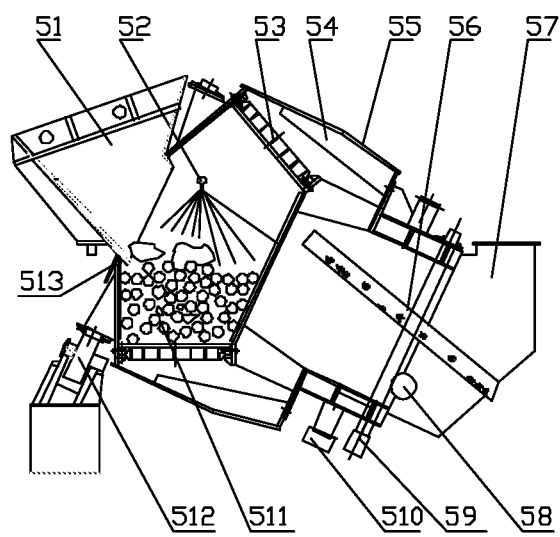
FIG. 5 is a schematic view showing a structure of a roller unit.

The roller unit 5 substantially comprises a feeding chute 51 capable of receiving both molten slag having good fluidity and solid tank bottom slag, a process water nozzle 52, grates 53, slag shoveling plates 54, a roller body 55, a discharging chute 56, a smoke hood 57, retaining mechanisms 58, a back supporting unit 59, a transmission mechanism 510, steel balls 511, a front supporting unit 512 and a fixed end cap 513. See FIG. 5, which is a schematic view showing a structure of a roller unit.

Figure 6:
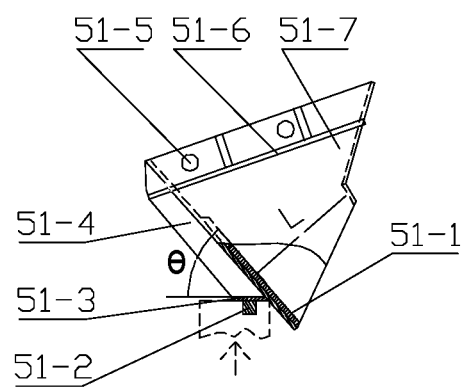
FIG. 6 is a schematic view showing a structure of a feeding chute.

The feeding chute 51 is positioned in front of the roller body 55, and mainly acts to guide molten slag. See FIG. 6, which is a schematic view showing a structure of a feeding chute. The feeding chute 51 adopts a steel framework, wherein a substrate 51-7 forms a chute frame having a top larger than a bottom. A top opening of the chute frame has a length of 3000-5000 mm and a width of 3000-4000 mm respectively, depending on a mouth size of the slag tank to ensure that tank bottom slag should not flow outside of the feeding chute when the tank is inverted. A feeding throat of the feeding chute 51 has a minimum size L of no less than 1500 mm. A chute wall has an angle θ of no less than 35° relative to a horizontal plane, particularly at a side that directly receives molten slag. A heat resistant lining plate 51-1 with a dimension of 30 mm or more is attached to an inner wall at the side that receives slag. The heat resistant lining plate 51-1 has a shape of a trapezoid having a top larger than a bottom, placed directly on the inner wall at the side that receives slag, not necessary to be immobilized by any means. Hence, it can be replaced conveniently. A reinforcing rib 51-4 and a supporting plate 51-3 are arranged at a side opposite the slag receiving side, and the reinforcing rib 51-4 reinforces the slag receiving side. An end face of the supporting plate 51-3 contacts the chute frame, and another end face thereof contacts a stand positioned on the ground, wherein the stand can transmit an impact force experienced by the feeding chute to the ground. A positioning shaft 51-2 acts to position the feeding chute, and a pin shaft 51-5 acts to hoist the feeding chute. A steel plate 51-6 having a groove shape is used to reinforce the substrate 51-7, and contacts a supporting face of the stand to aid in positioning.

Figure 7:
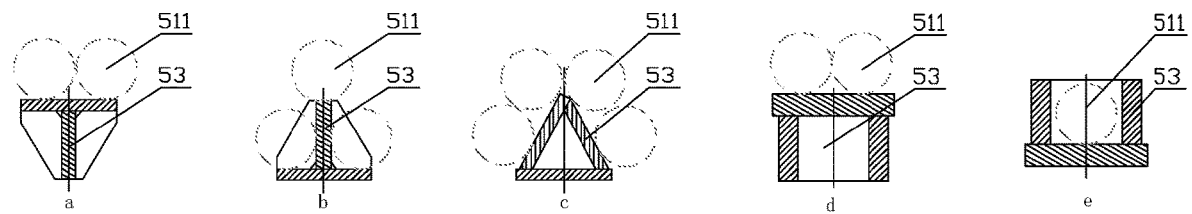

The process water nozzle 52 extends into a working chamber through the fixed end cap 513 to cool the steel balls 511 and the molten slag in the roller by spraying water. See FIG. 5. In order to prevent explosion caused by direct spray of cooling water on molten slag, a water spray cooling zone eludes a location where molten slag is guided in (i.e. slag falling site), such that only the steel balls before and behind the slag falling site are cooled by spraying water. The grates 53 are distributed uniformly in the roller body 55 with pressing blocks and bolts. The grates 53 and the other components in the roller body form a mouse-cage like roller body used to hold the steel balls 511 useful for cooling and the molten slag that is guided in. A space between the grates is set at 50-90 mm in light of the grate structure, the steel ball diameter, the expected service life of the steel balls and the requirement of the final slag particle size. FIG. 7 shows several specialized forms of grates, wherein FIG. 7a shows an upright T grate; FIG. 7b shows an inverted T grate; FIG. 7c shows a triangular grate; FIG. 7d shows an upright 7C grate; and FIG. 7e shows an inverted 7C grate; The roller body 55 is designed as a double-layer structure having an inner body and an outer body as desired. The inner body is substantially consisting of grates 53 and front and back end plates, in which the molten slag is cooled and broken rapidly. When the molten slag is cooled and broken to a certain particle size, the slag leaks through the space between the grates to the outer body. The shoveling plates 54 are designed to be distributed uniformly on an inner wall of the outer body. As the body rotates, the shoveling plates 54 can shovel up the steel slag falling into the outer body and guide it to the discharging chute 56 through which particulate slag is sent to a downstream final slag conveying mechanism 7. The smoke hood 57 mainly acts to collect and convey tail gas.

Figure 8:
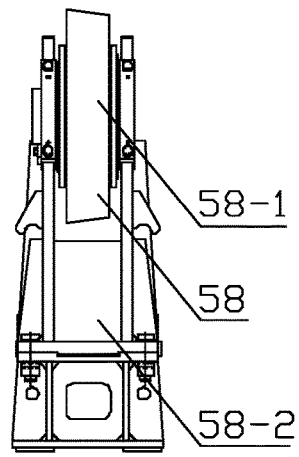
FIG. 8 is a schematic view of a retaining mechanism.

The retaining mechanisms 58 comprise two sets of retaining wheels 58-1, wherein the retaining wheels 58-1 are installed on a support 58-2. The retaining mechanisms 58 are positioned at two sides of the roller body respectively. A wheel face of the retaining wheel contacts a side of a back backing ring fixed on the roller body. To synchronize the side of the backing ring in rotation and the wheel face of the retaining wheel to avoid relative sliding which will damage a contact face, the wheel face of the retaining wheel is designed as a conical face, as shown by FIG. 8 which is a schematic view of the retaining mechanism.

Figure 9:
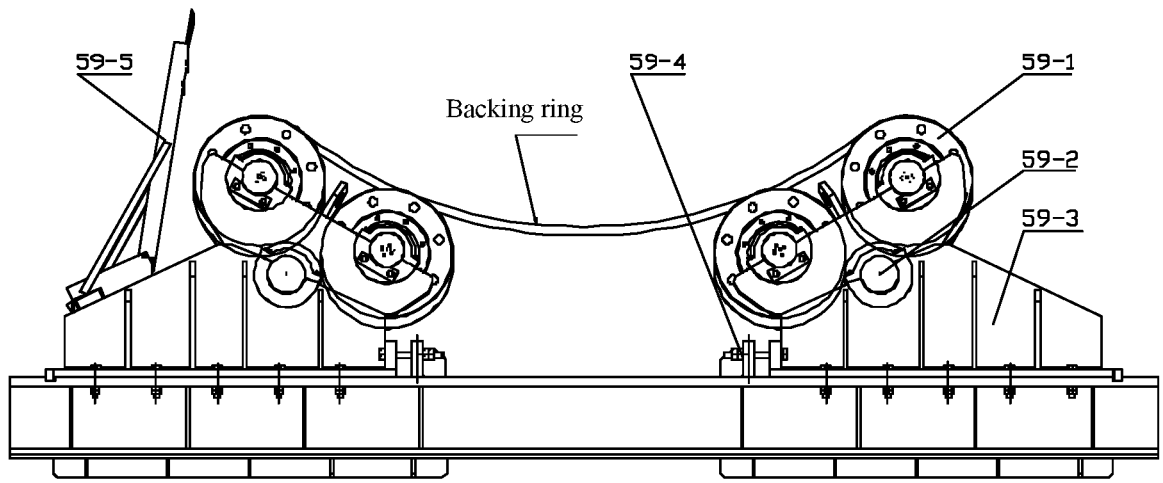
FIG. 9 is a schematic view of a supporting unit.

The back supporting unit 59 and the front supporting unit 512 have the same structure. See FIG. 9, which is a schematic view of the supporting unit. The supporting unit is comprised of two sets of supporting wheels, each of which has a structure comprised of two supporting wheels. The supporting unit comprises supporting wheels 59-1, a supporting shaft 59-2, an adjustable base 59-3, an adjusting mechanism 59-4, a scraping mechanism 59-5, wherein the two supporting wheels 59-1 are arranged in tandem and share a rotary shaft 59-2 whose center is adjusted automatically to ensure that the wheel face of each supporting wheel can be in ideal contact with the backing ring. The two sets of supporting wheels in tandem are installed on adjustable bases 59-3. The two adjustable bases 59-3 are positioned on the same pedestal to facilitate installation, positioning and prevention of poor contact caused by non-uniform foundation settlement. The relative positions of the supporting wheel sets can be adjusted by the adjusting mechanism 59-4, thereby positioning the roller body. The scraping mechanism 59-5 cooperates with the backing ring to clean dust and mud from the surface of the backing ring to guarantee good contact between the backing ring and the supporting wheels.

Figure 10:
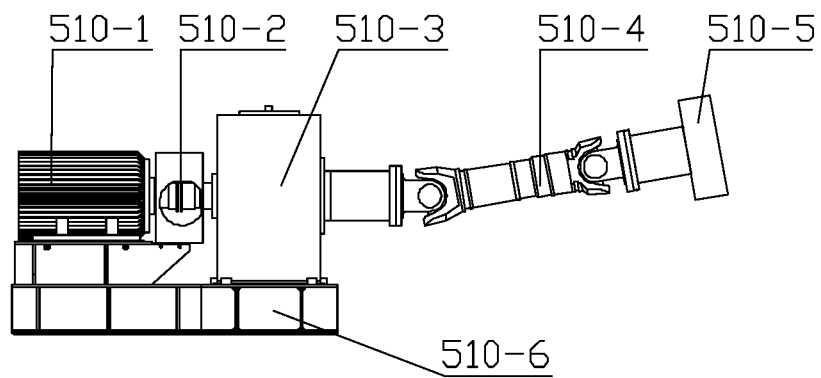
FIG. 10 is a schematic view showing a structure of a flexible transmission mechanism.

The transmission mechanism 510 is substantially consisting of a driving motor 510-1, a coupling 510-2, a speed reducer 510-3, a cardan shaft 510-4, a small gear shaft 510-5 and a base 510-6. See FIG. 10. The small gear shaft 510-5 is hung flexibly on a big gear ring of the roller body through a trailing mechanism. Flexible transmission of the roller is achieved by means of the cardan shaft 510-4 and the small gear shaft 510-5, so as to ensure good engagement between the small gear shaft and the big gear ring, and at the same time prevent damage to gear surface due to vibration of the roller body.

Figure 11:
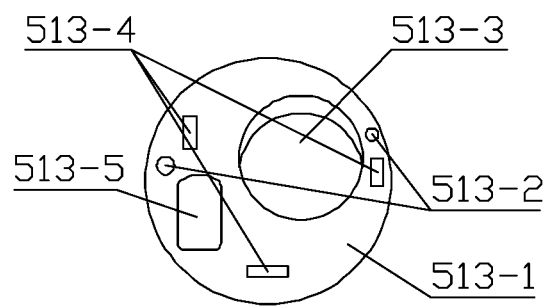
FIG. 11 is a schematic view showing a structure of a fixed end cap of a roller.

The fixed end cap 513 acts to enclose the gap between the feeding chute and the roller body, and thus prevent the slag and gas from flowing out of the roller body at the front end. See FIG. 11. The fixed end cap 513 comprises a hollow frame 513-1. On the fixed end cap 513 are arranged an access door 513-5 and a process water connecting opening 513-2 to facilitate equipment maintenance and immobilization of a process water pipe and a nozzle. The end cap has a feeding chute receiving opening 513-3 arranged eccentrically. A fixture stand 513-4 is used to hang the fixed end cap 513 in the air at a front opening of the roller body. There is a fit clearance between the outer edge of the end cap and the inner edge of the roller body opening for preventing interference and abrasion.

Figure 13:
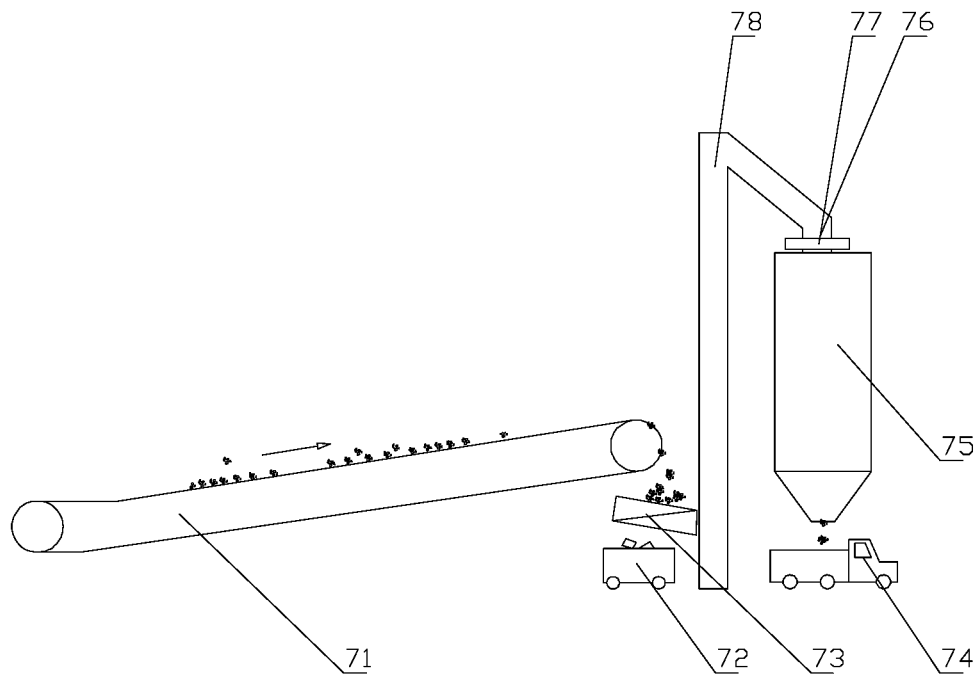
FIG. 13 is a schematic view of a system for conveying and storing particulate slag.

The particulate slag conveying and storing system 7 comprises a combined conveyor 71, a slag steel blocks trolley 72, a first vibrating sieve 73, a haulage truck 74, a transient bin 75, a second vibrating sieve 76, an iron remover 77 and a bucket elevator 78. See FIG. 13. The combined conveyor 71 is formed by combining an apron conveyor and a scraper conveyor. The apron conveyor is positioned above the scraper conveyor. The apron conveyor is used to convey a particulate slag material, and the scraper conveyor is used to convey a fine slag material dripping down from gaps in the apron conveyor along with waste water. The two conveyors are bonded together and sealed in a housing, simple and clean. The first vibrating sieve 73 can separate out slag steel particles which are carried away by the slag steel blocks trolley 72, thereby increasing resource recycling efficiency and preventing the large slag steel particles from impacting and blocking downstream devices. The first vibrating sieve 73 can also send the primarily screened slag material into the bucket elevator 78 uniformly. The second vibrating sieve 76 and the iron remover 77 are responsible for screening the slag material and separating iron and slag by online magnetic sorting and screening of the steel slag. The slag and iron are sent to corresponding transient bins 75 respectively. The final slag or slag steel in the bin is discharged at regular intervals and sent to users directly by the haulage truck 74. As such, the slag is treated and recycled as a resource in an environmentally friendly way, with no slag falling on the ground.

Figure 12:
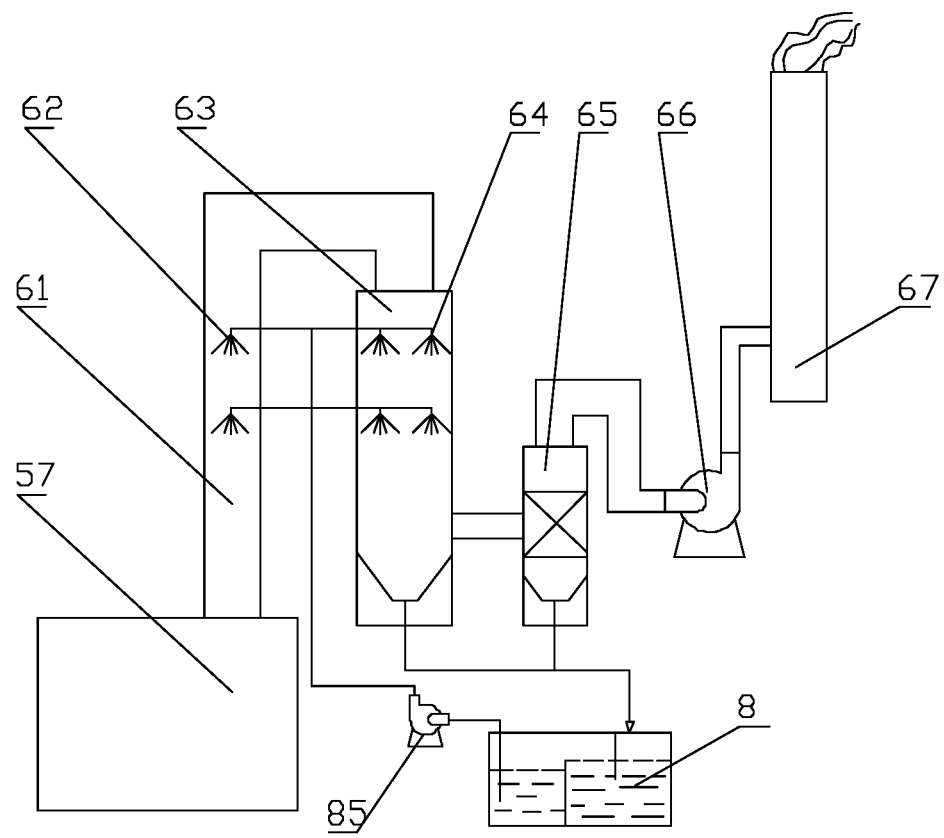
FIG. 12 is a schematic view of a system for tail gas emission and purification.

The tail gas emitting and purifying system 6 is comprised of a flue 61, water nozzles 62, dust remover 63, spray nozzles 64, a demister 65, a blower 66 and a smokestack 67. See FIG. 12. The water nozzles 62 are arranged in the flue 61, and the spray nozzles 64 are arranged in the dust remover 63. The function of the flue is made full use of to reduce the volume and work load of the dust remover 63. The demister 65 may assume a conventional shape of steel wire net. A cyclone manner is recommended to reduce the gas pressure drop, and reduce the load of the blower 66. Meanwhile, cleaning is rendered convenient. The circulating water used for tail gas purification is provided by a clean water circulating pump 85 in a water treatment system. Waste water is returned to the water treatment system 8 for simple treatment and then recycled. The tail gas purified by this process may have a dust concentration up to about 30 mg/m$^3$, and is emitted through the smokestack 67.

Figure 14:
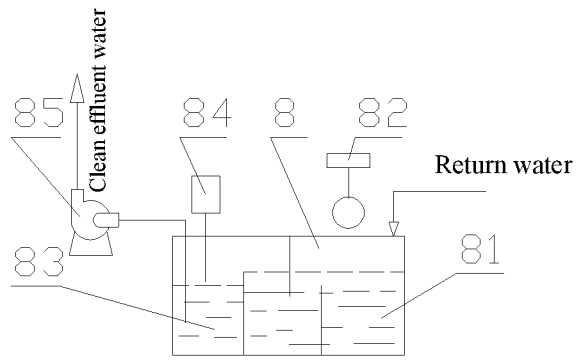
FIG. 14 is a schematic view of a water circulating system.

The cooling water circulating system 8 is comprised of a setting pool 81, a sludge cleaner 82, a clean water pool 83, a pH adjusting unit 84, a circulating water pump 85, supplemental and circulating water conduits, valves, etc. See FIG. 14. The settling pool 81 has a multi-stage settling function. It can act to precipitate slag mud, and block floating slag. After the waste water is clarified in the settling pool 81, large slag particles settle on the pool bottom, and are removed periodically by the sludge cleaner 82. The clean water enters the clean water pool 83 and is pumped out by the circulating water pump 85 for cooling the roller and dedusting the tail gas. When the circulating water has a pH of greater than 10, the pH adjusting unit 84 is used to add an industrial waste acid periodically to adjust the pH of the circulating water to 10 or less to prevent scaling in the conduits of the water circulating system.

Figure 15:
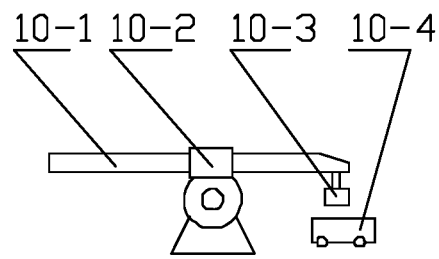
FIG. 15 is a schematic view showing a structure of a cold steel cleaning mechanism.

The cold steel cleaning mechanism 10 comprises a steel cleaning machine that is controlled hydraulically, and a cold steel trolley 10-4 for holding cold steel. The cold steel cleaning machine is comprised of an extendable arm 10-1, a base 10-2, an electromagnet 10-3 and corresponding electronic control systems. See FIG. 15. The extendable arm 10-1 is arranged on the base 10-2. Under the action of a hydraulic control system, the extendable arm 10-1 can extend forward and backward, and swing up and down as well as left and right, thereby driving the electromagnet 10-3 at an end portion to carry cold steel blocks in the roller to the cold steel trolley 10-4. Therefore, a function of mechanically cleaning the cold steel in the roller is realized under remote control.

The electronic control system 9 is comprised of an electronic control cabinet, PLC, a microcomputer and a mobile remote control.

Figure 1:
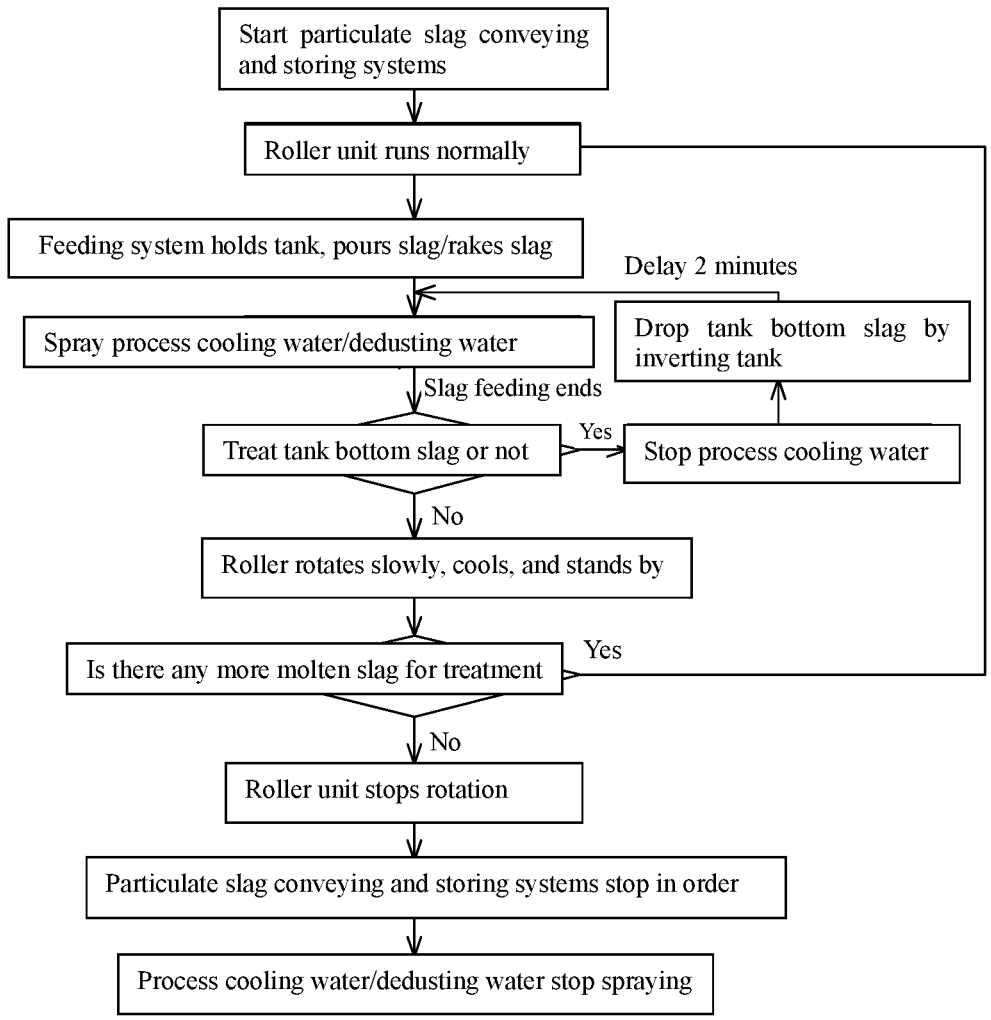
FIG. 1 is a flow chart of a roller treatment process suitable for total-amount steel slag treatment according to the disclosure.

See FIGS. 1, 2 and 3 for a roller treatment process suitable for total-amount steel slag treatment, wherein FIG. 2 shows a process scheme for treating molten slag having good fluidity and a portion of highly sticky solid steel slag by pouring and raking slag; and FIG. 3 shows a process scheme for treating tank bottom slag by inverting the tank.

A roller treatment process for total-amount steel slag treatment, comprising the following steps:

First, using a slag tank tilting mechanism to tightly hold a slag tank containing molten slag, horizontally translating the slag tank to a feeding position, and tilting the slag tank to pour molten slag having good fluidity in a controlled manner into a rotating roller unit through a feeding chute, thereby realizing the roller treatment;

Second, using a slag removal machine to rake highly sticky slag or solid slag out to the roller unit when steel slag remaining in the slag tank does not have fluidity and cannot flow out, or when steel slag in the slag tank does not have fluidity and cannot flow out;

Third, tilting the slag tank to a larger angle to drop remaining tank bottom slag into the roller unit, thereby achieving the total-amount steel slag treatment in a single roller unit.

When the tank bottom slag is dropped by inverting the tank, in view of the requirement of safe operation, spray of process cooling water in the roller is paused to avoid occurrence of a water-in-slag risk after the tank bottom slag is dropped into the roller as a whole. After the tank bottom slag is dropped by inverting the tank, the pause is continued for 2 minutes before the spray of the process cooling water is resumed.

Specifically, the roller treatment process suitable for total-amount steel slag treatment is as follows:

When there is molten slag for treatment, an iron remover 77—a vibrating sieve 76—a bucket elevator 78—a vibrating sieve 73—a combined conveyor 71—a roller unit 5—a circulating pump 85—water nozzles 62—spray nozzles 64 (a blower 66 does not stop in daily operation)—a slag tank tilting mechanism 1—a slag removal machine 4 (for pouring or raking molten slag 3 into a feeding chute 51 from a slag tank 2)—a process water nozzle 52 are put into work in order. Under the united action of the slag tank tilting mechanism 1 and the slag removal machine 4, the molten slag 3 is controllably poured or raked into the roller unit 5. With reference to FIG. 2, after entering a roller body 55 through the feeding chute 51, the molten slag falls on the surface of rolling steel balls 511 (slag falling zone) first of all. The molten slag penetrates into the gap between the steel balls, or is impacted and embedded by the rolling steel balls, thereby being cooled and solidified rapidly by the steel balls. Then, the slag leaves the slag falling zone as the steel balls roll, and enter a water cooling zone downstream of the slag falling zone. The steel balls and the steel slag preliminarily cooled and solidified by the steel balls are cooled again by and immersed in the cooling water sprayed by the process water nozzles 52 in the water cooling zone. The solidified steel slag is brittle, and can be easily broken into pieces by the steel balls. If the broken particulate slag is smaller than the space between grates 53, it will fall into an outer body of the roller from the space between the grates, be shoveled into a discharging chute 56 by a slag shovel plate 54 and enter the combined conveyor 71. Slag steel having a larger particle size is sorted out by the vibrating sieve 73 and sent onto a trolley for large slag steel blocks 72 to be returned directly for reuse in production. After the preliminary sorting, steel slag is sent onto the vibrating sieve 76 to be sorted, after which the steel slag enters a stock bin 75 for particles of set sizes. Meanwhile, the iron remover 77 sorts out magnetically steel particles and magnetically selectable slag which are sent into a magnetic slag bin 75. When the slag stock in the stock bin accumulates to a certain amount, it is quantitatively loaded onto a truck 74 below for delivery to a user. Tail gas 3 generated during treatment of the molten slag 3 in the roller unit 5 is collected into a flue 61 through a smoke hood 57. The dust-containing tail gas is preliminarily purified by the water nozzles 62 in the flue 61, and then enters a purifier 63 to be cleaned repeatedly by spray nozzles 64, followed by capture purification with a demister. The tail gas meeting the emission standards is compressed by the blower 66 into a smokestack 67 for emission on standard. The waste cooling water generated during the treatment using the roller unit and the return water in the process of dust removal enter a settling pool 81, wherein the waste water is subject to multi-stage settling and pH adjustment, after which the water is pumped out by the circulating pump 85 for participation in the cooling and washing processes in the system again.

After the molten slag 3 in the slag tank 2 has been treated completely or the solid slag has been raked into the roller unit 5, it's to be determined in light of the practical situation whether the tank bottom slag needs to be dropped into the roller unit by turning the tank over. If there is a need for treatment of bulky tank bottom slag, it's necessary to perform the following operations: stopping water jetting of the process water nozzle 52 in the roller unit 5; retracting the slag raking rod 42 of the slag removal machine 4 to release space for inverting the slag tank, as shown by FIG. 3; and operating the tilting mechanism 1 to increase the tilting angle of the slag tank 2 gradually to at least 150°, wherein the tank bottom slag in the slag tank 2 will fall off the slag tank piece by piece or even as a whole piece, and rush toward a slag receiving lining plate 51-1 of the feeding chute 51. The tank bottom slag 3 is rebounded by the lining plate 51-1 onto the surface of the steel balls in the roller unit 5. The bulky tank bottom slag 3 may be broken to a certain degree by the rebounding and impacting of the lining plate 51-1, and then further broken gradually under the impacting of the rolling steel balls 511 in the roller. Generally, the slag can entirely penetrate into the gap between the steel balls after 2 minutes. At this moment, the process water nozzle 52 is restarted to jet water to cool the steel balls and steel slag, and the roller enters a state of normal operation. When the bulky tank bottom slag is dropped by inverting the tank, the feeding chute 51 has to endure a large impact force. Therefore, the feeding chute 51 is designed to be supported and positioned separately. A positioning shaft 51-2 immobilizes the feeding chute 51 to a stand at a given position to prevent it from sliding forward, backward, to left or to right. A supporting plate 51-3 transmits the impact force received by the chute to the ground through the support. Such a design can completely transfer the huge impact force generated during dropping the bulky tank bottom slag by inverting the tank to the ground, while the fixed end cap and the roller body will not be impacted.

Most of the tank bottom slag 3 dropped into the feeding chute 51 moves onto the surface of the steel balls 511 in the roller directly during the dropping process, while a portion of the tank bottom slag that remains in the chute slides downward under gravity (the angle θ of the chute guarantees the sliding requirement of the tank bottom slag) along with the treatment of the slag material in the roller body, and enters the roller little by little to be cooled and broken into final particulate slag that meets relevant requirements.

10-15 minutes after the tank is inverted, the tank bottom slag in the roller is treated completely, passes through the downstream equipment, and then enters the transient stock storage bin 75. So far, a tank of molten slag from steel making is treated completely by the roller process. The slag tank is moved to receive slag under a converter/electric furnace all over again. The roller continues running at a low speed for 5-10 minutes. The roller equipment is cooled as necessary, and waits for a next tank of molten slag. When new molten slag is to be treated, the above operations only need to be repeated. If a downtime is necessary, the roller 5—the combined conveyor 71—the vibrating sieve 73—the bucket elevator 78—the iron remover 77—the vibrating sieve 76—the circulating pump 85—the blower 65 are stopped in order, so that the whole equipment stops working.

The whole equipment needs to be halted when cold steel is to be cleaned out from the roller. Particularly, the feeding chute 51 is removed, and a remote control is used to manipulate a cold steel cleaning mechanism 10 to extend an electromagnet 10-3 into the roller by means of an extendable arm 10-1, so as to transfer bulky cold steel into a cold steel trolley 10-4 for returning to production for use.

Example 1

A 150 ton electric furnace in a steel plant discharged about 20 ton flowing slag per furnace, wherein the molten slag had good fluidity. A 18 m³ slag tank was used to receive the slag under the furnace. Then, the slag was transported in a slag tank truck for 3 km to a slag treatment room where the roller process for slag treatment was performed. After the slag tank 2 arrived at the slag treatment room, a travelling crane was used to hoist the slag tank 2 to a tilting mechanism 1. After the tilting mechanism received the slag tank 2, a holding mechanism was used to immobilize the slag tank 2 tightly to a tilting bench which was moved front and back to a suitable position, thereby getting ready for operation of feeding slag by tilting the slag tank.

A particulate slag conveying and storing system 7 (i.e. an iron remover 77—a vibrating sieve 76—a bucket elevator 78—a vibrating sieve 73—a combined conveyor 71)—a roller unit 5 (a motor 510-1 drove the roller unit to run by means of a coupling 510-2, a speed reducer 510-3, and a cardan shaft 510-4 and a small gear shaft 510-5 of a flexible transmission mechanism)—a circulating pump 85—water nozzles 62 and spray nozzles 64 were started in order (a blower 95 did not stop during daily work). Preparation for operation of feeding slag was finished. The slag tank 2 was tilted slowly by the slag tank tilting mechanism 1 to pour the flowable molten slag 3 from the slag tank controllably into a feeding chute 51 in the roller unit 5. As the molten slag from the electric furnace had good fluidity, the molten slag 3 was poured directly onto a lining plate 51-1, and then flew into the roller. Because the molten slag had a washout effect on the lining plate 51-1, it was undesirable to set slag flow to an unchangeable falling position for a long time. The slag tank tilting mechanism 1 could fulfill this purpose conveniently: given that the horizontal position of the slag tank tilting mechanism is unchanged, a slag pouring mouth of the slag tank would move a distance backward relatively as a tilting angle increased, so that the slag falling position changed from a line to a plane, thereby avoiding possibility of damaging the lining plate locally by washing. As a result, a long service life of the lining plate was achieved. When the lining plate 51-1 was damaged to a certain degree by washout, it could be removed and replaced simply with a new one.

After passing through the chute 51 and entering a roller body 55, the molten slag penetrated into the gap between rolling steel balls 511, or were impacted and smashed by the rolling steel balls. The heat of the molten slag was absorbed rapidly by the steel balls. The molten slag was cooled and broken. When the slag had a particle size smaller than the space between roller grates, it passed through the space between the grates and fell into an outer body of the roller, where it was shoveled onto a discharging chute 56 by a slag shoveling plate in the outer body of the roller, and guided from the roller to the particulate slag conveying and storing system 7. After the slag was fed for 1-2 minutes, the temperatures of the steel balls and the roller body were somewhat increased. Process cooling water was jetted at a delayed time into the roller through nozzles 52 (evading slag falling sites) to water cool the steel balls and steel slag located upstream and downstream of the slag falling sites. The heat absorbed by the molten slag and steel balls was taken away by the cooling water which was discharged from the roller in the form of steam and waste water.

The particulate slag guided out by the discharging chute 56 was sent onto a vibrating sieve 73 by a combined conveyor 71. The vibrating sieve 73 had two roles, one of which was to sort out bulky slag steel (leaking out through the space between the grates) which was returned to a production process for reuse via a trolley or slag steel bucket 72, thereby preventing bulky, irregular slag steel from impacting and blocking downstream equipment; the other of which was to send particulate slag to a bucket elevator 78 uniformly after the sorting. After the particulate slag was lifted to a certain height, it entered a vibrating sieve 76, where the particulate slag was screened again and sent to a transient stock bin 75. On the vibrating sieve 76 was arranged an iron remover 77 which was able to separate magnetic slag steel from non-magnetic slag, so as to recover an iron resource and create conditions for use of the steel slag. When a certain amount of the steel slag was stored in the stock bin 75, it was sent by a truck 74 periodically to a corresponding user for use, so as to realize clean treatment of the molten slag with no slag falling on the ground.

Tail gas generated in the treatment process was emitted on standard through a tail gas emitting and purifying system 6.

| No. | Tail gas temperature/ °C. | Tail gas humidity/% | Tail gas amount (standard, dry) m³/h | Powder dust concentration mg/m³ | Average concentration mg/m³ |
|---|---|---|---|---|---|
| 1# | 75 | 23 | 68029 | 20.4 | 24.42 |
| 2# | 73 | 23 | 63903 | 20.7 | |
| 3# | 80 | 22 | 56367 | 39.6 | |
| 4# | 72 | 24.5 | 40879 | 18.3 | |
| 5# | 72 | 24.5 | 47877 | 23.1 | |

Because the molten slag had good fluidity, more than 90% of the molten slag could be controllably poured into the roller. Hence, there was no need to equip a slag removal machine in this Example. Less than 10% of the steel slag that remained in the slag tank was mainly tank-lining slag sticking to the wall and bottom of the slag tank. This part of slag was poured, by inverting the slag tank (i.e. tilting the slag tank to 150-180° using a travelling crane), into another slag tank for use as tank-lining slag. Alternatively, after inverting the slag tank, loose solid slag was also poured into the roller for roller treatment.

Example 2

In a steel making process using a 300 ton converter in a steel plant, after steel was discharged, slag splashing was employed to extend the service life of furnace lining. The slag was discharged at a low temperature, and the slag had poor fluidity, or even had no fluidity. About 30 ton slag was discharged per furnace. The molten slag was contained in a 33 m³ slag tank and conveyed by a rail trolley. In order to treat such steel slag using the roller process, a remote operable slag removal machine 4 was equipped in the process.

After the slag tank 2 arrived at a slag treatment room, a travelling crane was used to hoist the slag tank 2 to a tilting mechanism 1. After the tilting mechanism received the slag tank 2, a holding mechanism was used to immobilize the slag tank 2 tightly to a tilting bench which was moved front and back to a suitable position, thereby getting ready for operation of feeding slag by tilting the slag tank.

A particulate slag conveying and storing system 7 (i.e. an iron remover 77—a vibrating sieve 76—a bucket elevator 78—a vibrating sieve 73—a combined conveyor 71)—a roller unit 5 (a motor 510-1 drove the roller unit to run by means of a coupling 510-2, a speed reducer 510-3, and a cardan shaft 510-4 and a small gear shaft 510-5 of a flexible transmission mechanism)—a circulating pump 85—nozzles 62 and 64 were started in order (a blower 95 did not stop during daily work). Preparation for operation of feeding slag was finished.

The slag tank 2 was tilted slowly by the slag tank tilting mechanism 1, and the slag removal machine 4 was used to rake the steel slag from the slag tank 2 into a feeding chute 51 in the roller unit 5. Owing to the cooperative operation of the slag tank tilting mechanism 1 and the slag removal machine 4, more than 80% of the steel slag in the slag tank 2 was controllably raked by the slag removal machine 4 into the roller unit 5 for environmentally friendly treatment. The remaining 20% tank bottom slag required operation of inverting the tank.

When bulky tank bottom slag was treated, it was necessary to perform the following operations: stopping water jetting of a process water nozzle 52 in the roller; retracting the slag raking rod 42 of the slag removal machine 4 to release space for inverting the slag tank, as shown by FIG. 3; and operating the tilting mechanism 1 to increase the tilting angle of the slag tank gradually to at least 150°, wherein the tank bottom slag in the slag tank fell off the slag tank piece by piece or even as a whole piece, and rushed toward a slag receiving lining plate 51-1 of a feeding chute 51. The tank bottom slag 3 was rebounded by the lining plate 51-1 onto the surface of steel balls in the roller. The bulky tank bottom slag 3 was broken to a certain degree by the rebounding and impacting of the lining plate 51-1, and then further broken gradually under the impacting of the rolling steel balls 511 in the roller. Generally, the slag could all penetrate into the gap between the steel balls after 2 minutes. At this moment, the process water nozzle 52 was restarted to jet water to cool the steel balls and steel slag, and the roller entered a state of normal operation.

Most of the tank bottom slag 3 dropped into the feeding chute 51 moved onto the surface of the steel balls 511 in the roller directly during the dropping process, while a portion of the tank bottom slag that remained in the chute slid downward under gravity along with the treatment of the slag material in the roller body, and entered the roller little by little to be cooled and broken into final particulate slag that met relevant requirements.

After the tank was inverted for 10-15 minutes, the tank bottom slag in the roller was treated completely, passed through the downstream equipment, and then entered the transient stock storage bin 75. So far, a tank of molten slag from steel making was treated completely by the roller process. The slag tank 2 was moved to receive slag under the converter/electric furnace all over again. The roller continued running at a low speed for 5-10 minutes. The roller equipment was cooled as necessary, and waited for a next tank of molten slag. When new molten slag was to be treated, the above operations only needed to be repeated. If a downtime was necessary, the roller unit 5—the combined conveyor 71—the vibrating sieve 73—the bucket elevator 78—the iron remover 77—the vibrating sieve 76—the circulating pump 85—the blower 65 were stopped in order, so that the whole equipment stopped working.

The whole equipment needed to be halted when cold steel was to be cleaned out from the roller. Particularly, the feeding chute 51 was removed, and a remote control was used to manipulate a cold steel cleaning mechanism 10 to extend an electromagnet 10-3 into the roller by means of an extendable arm 10-1, so as to transfer bulky cold steel into a cold steel trolley 10-4. After the cold steel on the steel ball surface was cleaned completely, the roller was rolled at a low speed for 3-5 cycles to expose bulky cold steel embedded in the steel balls. Manipulation of the cold steel cleaning mechanism 10 was continued to clean out the bulky cold steel. All the bulky cold steel in the roller could be substantially cleaned out by repeating the operation several times. A roller unit employed the cold steel cleaning mechanism 10, and cleaned out 15 ton bulky cold steel in 2 hours. The high-quality cold steel was returned directly to the converter for use.

The roller treatment process and treatment device suitable for total-amount steel slag treatment according to the disclosure cover the auxiliary feeding system, the process structure of the roller itself, the final slag conveying and storing system, the tail gas purifying and emitting system, the water circulating system and the bulky cold steel mechanical cleaning system for roller treatment of molten steel slag. They form a complete process for roller treatment of molten slag (including solid tank bottom slag) from steel making. These systems work in a synergic way to achieve safe and controllable total-amount feeding of molten slag from steel making, roller granulation, convey and storage with no slag falling on the ground, emission of tail gas on standard, waste water recycling, and mechanical cleaning of bulky cold steel. From pouring/raking/dropping hot molten slag into a roller to separating slag and steel till entering of ambient temperature particulate slag into a stock bin for transient storage, the whole treatment cycle does not exceed 5 minutes. Slag steel and final slag may be separated and sorted on line, and sent directly to users for use as resources. Tail gas is emitted on standard. Cooling water is circulated in use with zero discharge. A short-cycle process for total-amount treatment of molten slag from steel making in a safe, environmentally friendly, recyclable manner is really realized.

The above description only reveals some preferred embodiments of the disclosure, with no intention to limit the protection scope of the disclosure. Therefore, all changes, equivalents, modifications within the spirit and principles of the disclosure are included in the protection scope of the disclosure.

What is claimed is:

1. A roller treatment device for total-amount steel slag treatment, comprising a feeding system, a roller unit (5), a particulate slag conveying and storing system (7), a tail gas emitting and purifying system (6), a cooling water circulating system (8), a cold steel cleaning mechanism (10) and an electronic control system (9);

wherein the feeding system comprises a slag tank tilting mechanism (1), a slag tank (2), and a slag removal machine (4);

wherein the slag tank tilting mechanism (1) is arranged off-set above a feeding chute (51) in the roller unit (5); the slag tank tilting mechanism (1) comprises a hydraulic mechanism and two tank holding arms, wherein the hydraulic mechanism is configured to drive the slag tank tilting mechanism (1) to move forward and backward along a horizontal rail, and the hydraulic mechanism is configured to drive the two tank holding arms to lift the slag tank (2) and control the slag tank (2) to rotate at an angle of 0-180 degrees;

wherein a steel framework is used for the feeding chute (51), which comprises a chute frame having a top larger than a bottom; a chute wall surface directly receiving the molten slag (3) has an angle θ of no less than 35° relative to a horizontal plane; a heat resistant lining plate (51-1) is attached to an inner wall at a side receiving the molten slag; a reinforcing rib (51-4) and a supporting plate (51-3) are arranged at a side opposite the side receiving the molten slag; an end face of the supporting plate (51-3) contacts the chute frame, and another end face thereof contacts a stand positioned on the ground;

wherein a positioning shaft (51-2) is arranged at a bottom of the chute frame, wherein the positioning shaft (51-2) acts to position the feeding chute (51); a pin shaft (51-5) is arranged at a top of the chute frame, wherein the pin shaft (51-5) is used to hoist the feeding chute; a steel plate (51-6) having a groove shape is arranged at the top of the chute frame for reinforcing and aid in positioning of the feeding chute; and wherein the slag removal machine (4) comprises a slag raking head (41), an extendable rod (42), a support (44) and a second hydraulic mechanism (45), wherein the slag raking head (41) is fixed to a frond end of the extendable rod (42); the extendable rod (42) is arranged on the support (44), wherein the extendable rod (42) is configured to extend forward and backward, and rotate up and down, left and right under control of the second hydraulic mechanism to rake the slag from the slag tank into the feeding chute (45).

2. The roller treatment device for total-amount steel slag treatment according to claim 1, wherein a thermal shield (43) is fixed to a front end of the support (44) for insulating and reflecting back thermal irradiation of the hot molten slag (3) in the slag tank (2).

3. The roller treatment device for total-amount steel slag treatment according to claim 1, wherein the heat resistant lining plate (51-1) has a trapezoid shape having a top larger than a bottom, placed directly on the inner wall at the side receiving the molten slag.

4. The roller treatment device for total-amount steel slag treatment according to claim 1, wherein the feeding chute (51) has a feeding throat having a minimum size L of no less than 1500 mm.

5. A roller treatment process for total-amount steel slag treatment with the roller treatment device of claim 1, wherein:

a slag tank tilting mechanism is used to tightly hold a slag tank containing molten slag and move the slag tank to a feeding position; and the slag tank is tilted to pour molten slag having good fluidity into a rotating roller unit through a feeding chute, thereby realizing the roller treatment; wherein a steel framework is used for the feeding chute, a chute frame having a top larger than a bottom; a chute wall surface directly receiving hot molten slag has an angle $\theta$ of no less than 35° relative to a horizontal plane; a heat resistant lining plate is attached to an inner wall at a side receiving the molten slag; a reinforcing rib and a supporting plate are arranged at a side opposite the side receiving the molten slag; an end face of the supporting plate contacts the chute frame, and another end face thereof contacts a stand positioned on the ground; a positioning shaft is arranged at a bottom of the chute frame, wherein the positioning shaft acts to position the feeding chute; a pin shaft is arranged at a top of the chute frame, wherein the pin shaft is used to hoist the feeding chute; a steel plate having a groove shape is arranged at the top of the chute frame for reinforcing the and aid in positioning of the feeding chute;

a slag removal machine is used to rake highly sticky slag or solid slag out to the roller unit when steel slag remaining in the slag tank does not have fluidity and cannot flow out, or when steel slag in the slag tank does not have fluidity and cannot flow out; and the slag tank is tilted to a larger angle to drop remaining tank bottom slag into the roller unit, thereby achieving the total-amount steel slag treatment in a single roller unit.

6. The roller treatment process for total-amount steel slag treatment according to claim 5, wherein when the tank is manipulated to drop the tank bottom slag, spray of process cooling water in the roller unit is paused; when the dropping of the tank bottom slag is finished, the spray of the process cooling water is resumed after an extended period of pause time.

7. The roller treatment process for total-amount steel slag treatment according to claim 6, wherein the extended period of pause time before resuming the spray of the process cooling water is 2 minutes.

\* \* \* \* \*